Patented Feb. 13, 1934

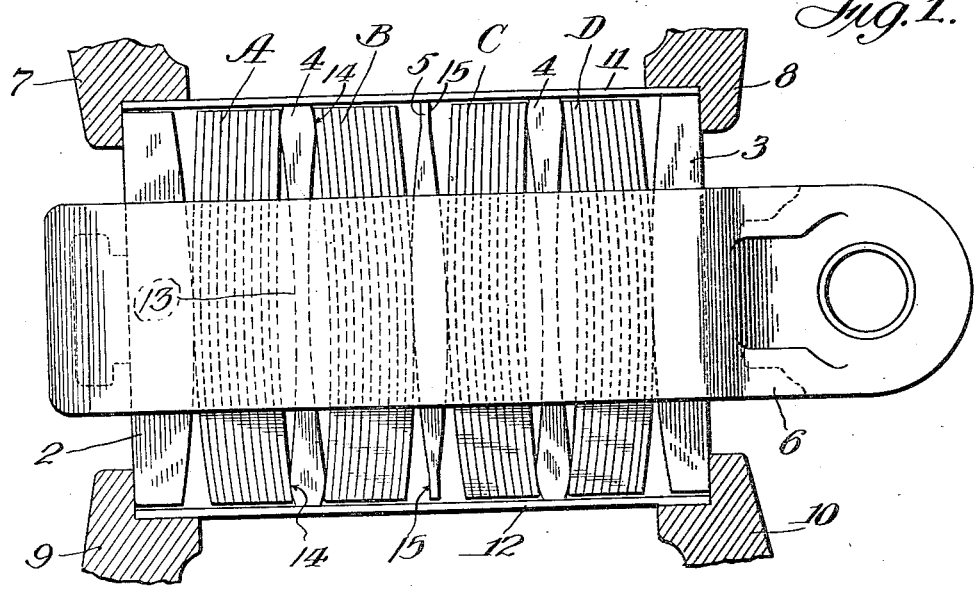

1,946,650

UNITED STATES PATENT OFFICE 1,946,650

FRICTION DRAFT GEAR

Herbert E. Van Dorn, Chicago, Ill., assignor to William E. Van Dorn, Pasadena, Calif.

Application June 16, 1928. Serial No. 285,813

6 Claims. (Cl. 213—30)

The present invention relates to friction cushioning devices for drawbars in which groups of resilient plates, lying against each other face to face, serve both as springs and as friction elements; and has for its object to produce a construction of this type that may be placed under any desired initial tension, and which shall operate effectively and efficiently in service.

Heretofore friction draft gears have been made with groups of flat spring plates frictionally engaged with each other; the plates being either straight, so that there can be no initial tension or, if curved and so adapted to be placed under an initial tension, simply changing their degree of curvature when the drawbar is moved longitudinally. In other words, where curved transverse plates have been employed, the ends of each plate were always required to spread apart during the entire movement of the drawbar in either direction from the normal position; the ends constantly approaching each other during the return movement of the drawbar from either direction to the normal position. The result of such a construction is that if the ends of some of the plates on one side of the rigging come in contact with the stationary cheek member, they bite into the latter as the plates are being straightened impairing if not entirely destroying the functions of the plates. Viewed specifically, the present invention may be said to have for its object to produce a simple and novel friction draft rigging employing transverse combined spring and friction plates, in which the plates may be curved to permit initial tension to be obtained, without permitting the plates to bite in or catch on the stationary side members or act otherwise to interfere with the proper functioning of the apparatus.

To this end I so shape the plates and the followers and spacers that during a closing movement, under either a push or a pull, the plates reverse their curvature, so that the ends of each plate first spread apart and are then drawn together again. Consequently, if an end of one of the plates should come in contact with a stationary side element when completely flattened or straightened, it would automatically be withdrawn from such element during the subsequent curving of the plate in the opposite direction.

The various features of novelty whereby my invention is characterized will hereinafter be pointed out with particularity in the claims; but, for a full understanding of my invention and of its objects and advantages, reference may be had to the following detailed description taken in connection with the accompanying drawing, wherein:

Figure 1 is a plan view of a draft rigging arranged in accordance with my invention, including the drawbar yoke and conventional stationary stop elements or abutments; Fig. 2 is a side view with the stationary stops omitted; and Fig. 3 is an edge view of one of the spring plates, shown in full lines in its initial condition and in dotted lines in the condition that it normally occupies in the draft rigging.

Referring to the drawing, A, B, C, and D represent four sets of flat spring plates. Each plate, 1, has a considerable initial curvature; the initial curvature being shown in full lines as in Fig. 3. In assembling the plates in the draft rigging, they are partially flattened, as indicated in dotted lines in Fig. 3. The initial and the final curvatures may be varied to suit the conditions, the particular curvatures that I have illustrated being simply for the sake of illustration.

In assembling the elements of the structure, the concave sides of two of the groups of plates face forwardly and the concave sides of the other two groups face toward the rear. The groups are placed in pairs, the concave sides in the groups of each pair facing each other. The plates are placed between followers 2 and 3 that are convex on their inner sides, so that each follower has a convex face engaged with a convex face on the adjacent group of spring plates. Between the groups of each pair, is placed a spacer 4 having both faces concave. Between the two pairs of groups of plates is a spacer 5 having both faces convex. In other words, each follower and spacer has a face or faces curved in the opposite direction from the adjacent face or faces of the spring plates. Any usual or suitable drawbar yoke 6 surrounds the followers with the interposed cushioning means.

In assembling the cushioning means and the yoke, pressure is applied to the outer faces of the followers so as to press them together and flatten the springs sufficiently to permit the yoke to be slipped over the followers. In this way the structure is placed under an initial tension which is maintained by the yoke.

The draft rigging is mounted on a car in any usual or suitable way, so that the followers engage with stationary abutments, such as indicated conventionally at 7, 8, 9 and 10. Suitable wearing plates, 11 and 12, may be placed between the two abutments on each side across the ends of the followers, spring plates and spacers.

At times when there is neither a pull nor a push on the drawbar, the spring plates are preferably flatter than when they are pressed into the concave seats in the spacers 4. In other words, the total movement in each direction from a straight or flat condition, in placing them under initial tension and in service, is preferably about the same.

When a pull is exerted on the drawbar, and therefore upon the yoke, tending to draw the yoke toward the right in Fig. 1, it will be seen that as the follower 2 moves toward the right it causes all of the springs to become flattened; and, as the movement continues, the springs will begin to curve in the opposite direction from their original curvature. Therefore the effective length of the spring plates increases during the first half of the movement and then again decreases during the last half. When the pull upon the yoke is released, the parts resume their normal positions; the plates first becoming flat and therefore longer, and then curving in the opposite direction, so that their effective length again decreases. When the yoke is pushed back by the drawbar, the action is precisely the same as that just described; the follower 2 remaining stationary, however, while the follower 3 moves toward the rear.

It will thus be seen that if any of the spring plates should tend to gouge into one of the wearing plates, this would occur during the first portion of the movement in either direction, whereas there would be a recession from the wearing plate during the remainder of the movement, and consequently there could be no interference with the proper functioning of the spring plates.

I prefer so to shape the spacers 4 so that the concavities do not extend entirely across the same. Thus, in the arrangement shown, each of these members has the main, concave portions 13 of each face, at the sides, merged into comparatively narrow convex marginal sections 14 whose curvature is about the same as that of the convex sides of the spring plates. Therefore, any tendency of the corners of the spring plates to dig into the spacers is avoided. When the spacers 4 are provided with these marginal portions, the corresponding parts of the spacer 5 are preferably left flat, as indicated at 15; the convex part of this spacer being of about the same width as the concave parts of the spacers 4.

While I have illustrated and described with particularity only a single preferred form of my invention, including four sets of spring plates, I do not desire to be limited to the exact structural details thus illustrated and described; but intend to cover all forms and arrangements which come within the definitions of my invention constituting the appended claims.

I claim:—

1. In a cushioning means, a group of spring plates in frictional contact with each other and curved from end to end, a rigid member having a convex face engaged with the convex face of the plates, and a second rigid member having a concave face engaged with the concave side of the plates.

2. A cushioning means comprising spring plates in frictional contact with each other and gradually curved in the lengthwise direction, the plates being in two groups, the concave sides of the two groups facing each other, a spacer arranged between the two groups and having concave faces, and rigid members having convex faces engaged with the convex faces of the two groups.

3. A cushioning device comprising two pairs of groups of spring plates, the plates of each group being curved from end to end and engaged face to face in frictional relation to each other, the groups of each pair having their concave sides directed toward each other, a follower at each end of the device having a convex face engaged with the adjacent spring plate, a spacer having convex sides arranged between the two pairs of groups of plates, and a spacer having concave sides arranged between the two groups of plates of each pair.

4. In a cushioning means, a group of curved spring plates in frictional contact with each other, two rigid members lying on opposite sides of and in contact with said plates, the major portion of the face of one of said members in engagement with the plates being concave and the marginal portions being convex, and the major portion of the face of the other member engaged with said plates being convex while the marginal portions are flat.

5. In a cushioning means, a group of spring plates in frictional contact with each other and curved from end to end, a rigid member having a convex face engaged with the convex face of the plates, a second rigid member having a concave face engaged with the concave side of the plates, and means engaged with the endmost rigid members to hold them in such spaced relation to each other that said plates are initially held in a partially flattened condition.

6. In a cushioning means, a group of spring plates in frictional contact with each other and curved from end to end, a rigid member having a convex face engaged with the convex face of the plates, a second rigid member having a concave face engaged with the concave side of the plates, means engaged with the endmost rigid members holding them initially in such spaced relation to each other that said plates are partially flattened, the curvature of the concave seats being of smaller radius than the curvature of the plates during the time the cushioning means is uncompressed.

HERBERT E. VAN DORN.